United States Patent [19]

Inoue et al.

[11] 4,439,567

[45] Mar. 27, 1984

[54] PROCESS FOR INJECTION MOLDING POLYOLEFIN RESIN COMPOSITIONS

[75] Inventors: Takeo Inoue; Jun Otsu; Tateyo Sasaki; Hiroyuki Doi; Keigo Suehiro, all of Hiroshima, Japan

[73] Assignee: Mitsui Toatsu Chemicals, Inc., Hiroshima, Japan

[21] Appl. No.: 396,202

[22] Filed: Jul. 8, 1982

Related U.S. Application Data

[63] Continuation of Ser. No. 280,000, filed as PCT JP 79/00290, Nov. 14, 1979, published as WO 81/01410, May 28, 1981, § 102(e) date, Jul. 2, 1981, abandoned.

[51] Int. Cl.$^3$ .............................................. C08K 5/15
[52] U.S. Cl. ................................... 524/108; 524/354
[58] Field of Search .............................. 524/354, 108

[56] References Cited

U.S. PATENT DOCUMENTS

| | | | |
|---|---|---|---|
| 3,332,900 | 7/1967 | Reischl et al. | 524/188 |
| 4,016,118 | 4/1977 | Hamada et al. | 523/100 |
| 4,294,747 | 10/1981 | Su | 524/108 |

*Primary Examiner*—Joseph L. Schofer
*Assistant Examiner*—N. Sarofim
*Attorney, Agent, or Firm*—Sughrue, Mion, Zinn, Macpeak and Seas

[57] ABSTRACT

There is provided a polyolefin resin composition for injection molding which comprises adding to polyolefin a condensate of sorbitol with an aldehyde compound and a lubricant of 1/20 to 1/2 parts by weight based on 1.0 part by weight of said condensate. Thereby polyolefin injection moldings with good transparency are obtained without bringing a foaming phenomenon.

3 Claims, No Drawings

PROCESS FOR INJECTION MOLDING POLYOLEFIN RESIN COMPOSITIONS

This is a continuation of application Ser. No. 280,000, filed as PCT JP 79/00290, on Nov. 14, 1979, published as WO 81/01410, on May 28, 1981, § 102(e) date July 2, 1981, abandoned.

FIELD OF THE INVENTION

This invention relates to a polyolefin resin composition suitable for obtaining injection molding products with good transparency.

BACKGROUND OF THE ART

It is, hitherto, known that an improvement of a polyolefin injection molding product in transparency is attained with use of additives such as dialkyleneglycol alkyl ethers, benzenesulfonic acid esters, ammonium salt of benzenecarboxylic acid, thiodicarboxylic acids, aluminum salt of di-p-t-butylbenzoic acid, dibenzylidene-D-sorbitol or the like. For example, condensates of sorbitol with aldehyde compounds such as dibenzylidenesorbitol or 1.3,2.4-di(methylbenzylidene)sorbitol are disclosed in Japanese Tokkyo Kokai No. 51-22740 and No. 53-117044. These condensates are useful in improving the transparency, but there are disadvantages that foams or blisters often occur on the surface of or inside molding products so that the practical value is lost.

An object of this invention is to provide polyolefin resin compositions suitable for producing injection molding products having good transparency without presenting a foaming or blistering phenomenon.

DISCLOSURE OF THE INVENTION

In accordance with this invention, there is provided a polyolefin resin composition for injection molding which comprises adding to polyolefin a condensate of sorbitol with an aldehyde compound and a lubricant of 1/20-½ parts by weight based on 1.0 part by weight of said condensate. Injection molding products of polyolefin having good transparency without bringing a foaming phenomenon are obtained by using a condensate of sorbitol with an aldehyde compound in combination with a lubricant.

BEST MODE FOR CARRYING OUT THE INVENTION

The polyolefin which may be used in this invention includes propylene homopolymer, propylene-ethylene random copolymer, propylene-ethylene block copolymer, propylene-butene-1 random copolymer, low density ethylene polymers, ethylene-propylene random copolymer, ethylene-butene-1 random copolymer, butene-1-ethylene random copolymer, butene-1-propylene random copolymer and the like. These may be used alone or in mixture of two or more.

The sorbitol-aldehyde condensate which may be used in this invention is represented by the formulae,

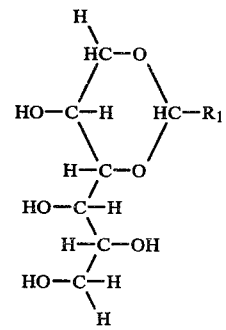

or

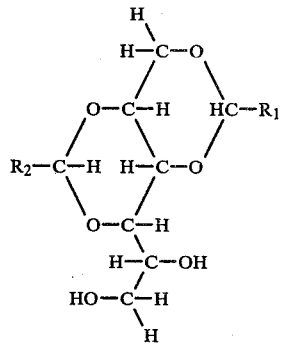

wherein
$R_1$ and $R_2$ are each a saturated or unsaturated alkyl group having 1–30 carbon atoms, for example, ethyl, n-hexyl, iso-hexyl, n-undecyl, 2-nonyl-2-butenyl and others;

an alicyclic hydrocarbon group or its derivatives, for example, cyclohexyl, p-methyl-cyclohexyl and others; and an aromatic hydrocarbon group or its derivatives, for example, phenyl, p-methylphenyl, m-methylphenyl, o-methylphenyl, p-ethylphenyl, p-hexylphenyl, 1-naphthyl, 1-anthryl, benzyl and so on.

The following are typical examples of these condensates which may be used alone or in mixture of two or more.

$R_1$ and $R_2$; Saturated or unsaturated alkyl groups of $C_1$–$C_{30}$:
1.3-heptanylidenesorbitol,
1.3,2.4-diheptanylidenesorbitol,
1.3,2.4-di(3-nonyl-3-pentenylidene)sorbitol, Alicyclic hydrocarbon groups or derivatives thereof:
1.3-cyclohexanecarbylidenesorbitol,
1.3,2.4-dicyclohexanecarbylidenesorbitol,
1.3,2.4-di(p-methylcyclohexanecarbylidene)sorbitol, Aromatic hydrocarbon groups or derivatives thereof:
1.3-benzylidenesorbitol,
1.3,2.4-dibenzylidene-D-sorbitol,
1.3,2.4-di(m-methylbenzylidene)sorbitol,
1.3,2.4-di(p-ethylbenzylidene)sorbitol,
1.3,2.4-di(p-hexylbenzylidene)sorbitol,
1.3,2.4-di(1-naphthalenecarbylidene)sorbitol,
1.3,2.4-di(phenylacetylidene)sorbitol.

A process for the synthesis of the sorbitol-aldehyde condensates is not particularly limited, though in general they are obtained by heating a mixture of sorbitol and an aldehyde compound in the presence of a dehydration catalyst such as anhydrous phosphoric acid or sulfuric acid. Such a synthesis process is disclosed in, for example, Japanese Patent Publication No. 47-7460. In the case of dibenzylidenesorbitol, 45.9 g of sorbitol, 39.8 g of benzaldehyde and 4 g of a concentrated sulfuric acid are charged to a container provided with a reflux condenser, a Liebig condenser, a liquid pouring tube (safety tube), a stirrer and a gas inlet, heated on an oil bath to 178° C. and maintained at same temperature for 30 hours. Then, after cooling, the temperature is lowered to about 60° C., 50 cc of methanol are added from the safety tube and the temperature is elevated to 100° C. At that time a mixture of benzaldehyde, methanol and water is effected. After completion of the effluence the reaction product mixture is cooled, poured into a large quantity of water to remove sulfuric acid and then, benzaldehyde is washed out with hot water. Thus a white solid dibenzylidenesorbitol is obtained. Other condensates may be obtained in the same procedure. Also, the starting sorbitol may be the D-form, L-form or racemic-form.

The sorbitol-aldehyde condensate may be used in the amount of preferably, 0.05-2.0 parts, more preferably 0.1-1.0 parts by weight based on 100 parts by weight of polyolefin. With an amount of less than 0.05 parts, the effect of improving transparency is hardly attained, whereas with an amount of more than 2.0 parts the effect of improving transparency is reduced on the contrary and also the product obtained becomes expensive.

The lubricants which may be used are, for example, saturated or unsaturated aliphatic amides and derivatives thereof, e.g. hexic acid amide, octic acid amide, stearic acid amide, oleic acid amide, erucic acid amide, ethylenebisstearic acid amide, lauric acid amide, behenic acid amide, methylenebisstearic acid amide, ricinoleic acid amide and so on: saturated or unsaturated aliphatic esters having 3-30 carbon atoms and derivatives thereof, e.g. butyl stearate, isobutyl stearate and so on: silicone compounds, e.g. a commercially available silicone mold release agent, silicone oil and so on. The silicone compounds are, preferably, linear organopolysiloxanes having a viscosity of 10-100,000 centistokes and more preferably, a straight chain dimethylpolysiloxane.

These lubricants may be used alone or in mixture of two or more within the range of preferably, 1/20 to ½ parts and more preferably, 1/10 to ¼ parts based on 1.0 parts by weight of the sorbitol-aldehyde condensate. When the amount is less than 1/20 parts, a foam controlling effect is not attained. On the other hand, when the amount exceeds ½ parts, the foaming or blistering is prevented, but there are disadvantages that the effect of improvement in transparency is reduced, molds are remarkably contaminated and the cost for production of moldings becomes expensive.

The composition of this invention may be used in combination with antioxidants, dyestuffs, ultraviolet absorbers and others. This invention will be illustrated by the following Examples.

EXAMPLE 1 AND COMPARATIVE EXAMPLE 1

Indicated amounts of the sorbitol-aldehyde condensate, indicated amounts of erucic acid amide and 0.1 part by weight of 2,6-di-t-butyl-4-methylphenol were mixed with 100 parts by weight of a propylene-ethylene random copolymer [ethylene content: 3.5% by weight, melt flow index: 15 g/10 minutes (ASTM-D-1238-62T)], which were then extruded with a 65 mm φ extruder at 250° C. to obtain pellets.

The pellets obtained were formed to an injection molding sheet of 7.8 cm width × 15.7 cm length × 2 mm thickness with an injection molding machine at 250° C. and then, tested in respect of transparency and a degree of foaming. The transparency is indicated by a haze (%) (or a degree of cloudiness) measured in accordance with JIS-K 6714. The results are set forth in Table 1, which show that the process of this invention is extremely effective for the prevention of foaming.

TABLE 1

| | | Polypropylene Composition | | Injection Molding Sheet | |
|---|---|---|---|---|---|
| | Run No. | PP wt. part | Sorbitol-Aldehyde Condensates wt. part | Erucic acid amide wt. part | Haze % | Degree of Foaming |
| Ex. 1 | 1 | 100 | Dibenzylidene-D-sorbitol 0.25 | 0.02 | 25.3 | No foam |
| | 2 | " | Dibenzylidene-D-sorbitol 0.25 | 0.05 | 26.4 | " |
| | 3 | " | Dibenzylidene-D-sorbitol 0.25 | 0.10 | 26.3 | " |
| | 4 | " | Dibenzylidene-D-sorbitol 0.5 | 0.08 | 23.0 | " |
| | 5 | " | Dibenzylidene-D-sorbitol 0.5 | 0.20 | 23.6 | " |
| | 6 | " | 1.3,2.4-Di(p-ethylbenzylidene)sorbitol 0.25 | 0.02 | 18.9 | " |
| | 7 | " | 1.3,2.4-Di(p-ethylbenzylidene)sorbitol 0.25 | 0.05 | 19.2 | " |
| | 8 | " | 1.3,2.4-Di(p-ethylbenzylidene)sorbitol 0.25 | 0.10 | 19.5 | " |
| | 9 | " | 1.3,2.4-Di(p-ethylbenzylidene)sorbitol 0.5 | 0.08 | 17.8 | " |
| | 10 | " | 1.3,2.4-Di(p-ethylbenzylidene)sorbitol 0.5 | 0.20 | 18.0 | " |
| | 11 | " | 1.3,2.4-Di(m-methylbenzylidene)sorbitol 0.25 | 0.02 | 23.6 | " |
| | 12 | " | 1.3,2.4-Di(m-methyl- | 0.05 | 23.9 | " |

TABLE 1-continued

| | Run No. | Polypropylene Composition | | Erucic acid amide wt. part | Injection Molding Sheet | |
|---|---|---|---|---|---|---|
| | | PP wt. part | Sorbitol-Aldehyde Condensates wt. part | | Haze % | Degree of Foaming |
| | 13 | " | 1.3,2.4-Di(m-methyl-benzylidene)sorbitol 0.25 | 0.10 | 24.2 | " |
| | 14 | " | 1.3,2.4-Di(m-methyl-benzylidene)sorbitol 0.25 | 0.08 | 21.2 | " |
| | 15 | " | 1.3,2.4-Di(m-methyl-benzylidene)sorbitol 0.5 | 0.20 | 21.3 | " |
| Comp. Ex. 1 | 16 | " | — | — | 74.7 | No foam |
| | 17 | " | Dibenzylidene-D-sorbitol 0.5 | — | 23.7 | Extremely foaming |
| | 18 | " | Dibenzylidene-D-sorbitol 0.5 | 0.01 | 24.1 | Much foaming |
| | 19 | " | 1.3,2.4-Di(p-ethyl-benzylidene)sorbitol 0.5 | — | 18.2 | Extremely foaming |
| | 20 | " | 1.3,2.4-Di(p-ethyl-benzylidene)sorbitol 0.5 | 0.01 | 18.0 | Much foaming |
| | 21 | " | 1.3,2.4-Di(m-methyl-benzylidene)sorbitol 0.5 | — | 21.1 | Extremely foaming |
| | 22 | " | 1.3,2.4-Di(m-methyl-benzylidene)sorbitol 0.5 | 0.01 | 21.3 | Much foaming |

EXAMPLE 2

Injection molding sheets were obtained in the same procedure as in Example 1 except using a libricant set forth in Table 2 instead of erucic acid amide. The test results are given in Table 2.

It is clear therefrom that the process of this invention is remarkably effective for the prevention of foaming.

TABLE 2

| | | Ex. 2 | | | |
|---|---|---|---|---|---|
| | | Polypropylene Composition | | Injection Molding Sheet | |
| Run No. | PP wt. part | Sorbitol-Aldehyde Condensates wt. part | Lubricants wt. part | Haze % | Degree of Foaming |
| 1 | 100 | Dibenzylidene-D-sorbitol 0.5 | Oleic acid amide 0.08 | 23.6 | No foam |
| 2 | " | Dibenzylidene-D-sorbitol 0.5 | Stearic acid amide 0.08 | 24.1 | " |
| 3 | " | Dibenzylidene-D-sorbitol 0.5 | Erucic acid amide: Oleic acid amide: Stearic acid amide = 90:5:5 (wt. ratio) 0.08 | 23.0 | " |
| 4 | " | Dibenzylidene-D-sorbitol 0.5 | Butyl stearate 0.03 | 23.8 | " |
| 5 | " | Dibenzylidene-D-sorbitol 0.5 | Silicone oil* 0.08 | 24.5 | " |
| 6 | " | 1.3,2.4-Di(p-ethyl-benzylidene)sorbitol 0.5 | Oleic acid amide 0.08 | 18.0 | " |
| 7 | " | 1.3,2.4-Di(p-ethyl-benzylidene)sorbitol 0.5 | Stearic acid amide 0.08 | 18.2 | " |
| 8 | " | 1.3,2.4-Di(p-ethyl-benzylidene)sorbitol 0.5 | Erucic acid amide: Oleic acid amide: Stearic acid amide = 90:5:5 (wt. ratio) 0.08 | 18.0 | " |
| 9 | " | 1.3,2.4-Di—(p-ethyl-benzylidene)sorbitol 0.5 | Butyl stearate 0.08 | 18.5 | " |
| 10 | " | 1.3,2.4-Di(p-ethyl-benzylidene)sorbitol 0.5 | Silicone oil* 0.08 | 18.8 | " |
| 11 | " | 1.3,2.4-Di(m-methyl-benzylidene)sorbitol 0.5 | Oleic acid amide 0.08 | 21.5 | " |
| 12 | " | 1.3,2.4-Di(m-methyl-benzylidene | Butyl stearate | 21.2 | " |

TABLE 2-continued

| | | Ex. 2 | | | |
|---|---|---|---|---|---|
| | | Polypropylene Composition | | Injection Molding Sheet | |
| Run No. | PP wt. part | Sorbitol-Aldehyde Condensates wt. part | Lubricants wt. part | Haze % | Degree of Foaming |
| | | benzylidene)sorbitol 0.5 | 0.08 | | |

*TSM 451-200, the tradename by Toshiba Silicone Ltd., Japan

Industrial Applicability:

As described above, when the compositions of this invention are subject to injection molding, the transparency of the moldings is remarkably improved without presenting a foaming phenomenon and thus, transparent moldings having a good appearance are obtained.

We claim:

1. A process for producing injection molded polyolefin products of good transparency without foaming or blistering which comprises forming a polyolefin resin composition by adding to a polyolefin a condensate of sorbitol with an aldehyde compound and a lubricant in an amount of 1/20-½ parts by weight based on 1.0 part by weight of said condensate, wherein said lubricant is at least one member selected from the group consisting of a saturated or unsaturated aliphatic amide having 3-30 carbon atoms and its derivatives, a saturated or unsaturated aliphatic monocarboxylic acid ester having 3-30 carbon atoms, and a silicone compound, and injection molding said polyolefin resin composition.

2. The process of claim 1 wherein the condensate content is comprised between 0.05 and 2 parts by weight based on 100 parts by weight of the polyolefin.

3. The process of claim 1 wherein said condensate is at least one member represented by the formulae,

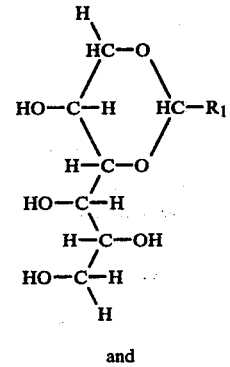

and

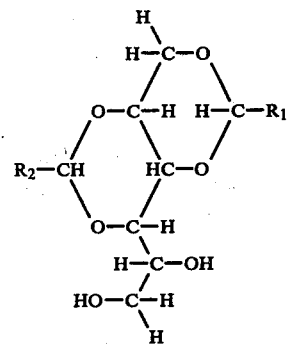

wherein $R_1$ and $R_2$ each is a saturated or unsaturated alkyl group of 1 to 30 carbon atoms, an alicyclic hydrocarbon group or its derivatives, or an aromatic hydrocarbon group or its derivatives.

* * * * *